United States Patent Office 3,598,671
Patented Aug. 10, 1971

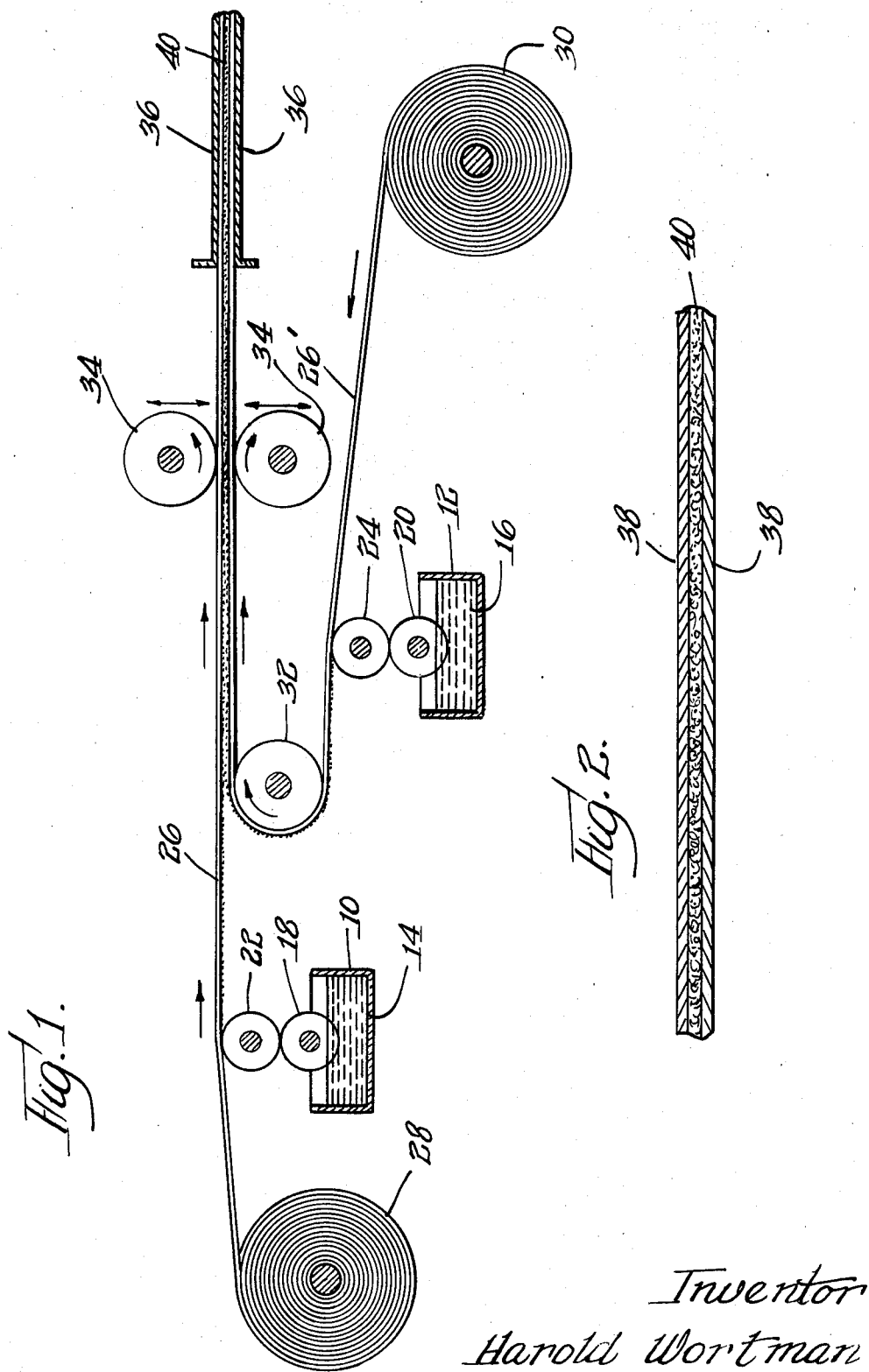

3,598,671
METHOD OF PREPARING FOAM PLASTIC
LAMINATED STRUCTURES
Harold Wortman, 5936 Monroe,
Morton Grove, Ill. 60053
Filed July 24, 1968, Ser. No. 747,175
Int. Cl. B29c 27/08
U.S. Cl. 156—73                                  6 Claims

ABSTRACT OF THE DISCLOSURE

A method of preparing foam plastic laminated structures wherein the reactive components necessary to form a plastic foam are separately applied to opposed surfaces of a base material whereby, when the said surfaces are brought into proximity to one another, the different reactive components thereon will intermix and react to form an adherent foam of preselected density and thickness therebetween.

The fabrication of laminated structures such as panelling comprising parallely arranged members, formed of a suitable base material, having a layer of a foamed plastic therebetween which is adhered to the inner surfaces of said members, heretofore involved, in the main, a series of steps which included securing, by means of an adhesive, for example, a preformed sheet of a foamed plastic to the inner surface of one sheet of a base and then securing, by the same means, a second sheet of a base material to the exposed surface of the preformed foamed plastic layer. This practice, apart from its cumbersomeness, has a number of economic disadvantages both from the standpoint of added raw material costs, and increased costs due to the amount of time and labor required in the fabrication of the laminated panelling. More recently, especially in the case of laminated panelling embodying polyurethane foam as an intermediate layer, it has been proposed to employ a foaming head to apply the premixed reactive components necessary to produce the polyurethane foam directly onto one surface of a sheet material, and immediately thereafter place a second sheet on the reactive component layer whereby the foam forms between the sheets and becomes adhered to the inner surfaces thereof. This method, while enabling laminated panelling of the type here under consideration to be produced more economically than by prior practices, suffers a number of shortcomings, chief among which are difficulties in evenly distributing the premixed reactive components on a surface, the lack of uniformity in the final foam layer, and loss of material during application of the premix, and after the foam is formed.

In accordance with the present invention, a unique method of preparing plastic foam-containing laminates has been evolved which eliminates the aforementioned disadvantages of methods heretofore employed for making such laminates. The method of this invention, apart from its economic advantages, enables the preparation of laminates having a plastic foam layer of any of a variety of properties desired. More specifically in this latter connection, the method enables, in a continuous, completely automated, operation, the preparation of laminates wherein the foamed layer can be selectively controlled not only from the standpoint of its chemical make-up, but also its physical characteristics including degree of rigidity or flexibility, density and thickness. The method, furthermore, can be utilized to prepare laminated panelling of desired size and shape, employing standard equipment.

Briefly, the method of the present invention comprises applying a coating, layer or film which incorporates one component, at least, of the reactive components necessary to form a plastic foam, onto a surface of one sheet of a base material, applying a coating, layer or film which incorporates another component of the reactive components necessary to form, with said one component, a plastic foam, onto a surface of a second sheet of a base material, and placing the thusly coated surfaces into opposed relation with respect to one another to effect mixing of the reactive components thereon and the formation of an adherent plastic foam layer between the sheets of base material. The sheets, at the time they are placed into opposed relation to one another, advantageously are first agitated, or vibrated, to accelerate and promote mixing of the reactive components, and are then passed into a restricted area wherein the thickness and density of the plastic foam formed by the reactive components can be selectively controlled. Plastic foam-containing laminates prepared in accordance with the present invention can be made by utilizing separate panels of a base material of desired dimensions, or by utilizing sheet material in roll form which, after formation of the laminate, can be later sliced, or cut, into sections of desired dimensions.

Sheet or base materials having utility in the practice of the present invention can be rigid or flexible and may be fabricated of metal, plastic, wood, fiberglass, paperboard, paper, fiberboard, and the like. As indicated, the sheet or base material can be employed in the form of separate panels or in roll form. In applying the reactive component moieties which, in combination, are necessary to form an adherent plastic foam layer between opposed surfaces of the sheet or base material, conventional techniques such as spraying, brushing, kiss-roll coating, reverse-roll coating, curtain coating, flow coating, and the like, can be used.

The plastic foam layer of laminated structures prepared by the method of the present invention can be selected from a wide group of such materials. Exemplary thereof are urethane foams, silicone resin foams, cellular vinyl foams, foamed phenolics, epoxy foams, cellulose acetate foams, urea-formaldehyde foams, cellular polyamides, cellular polyethylene, cellular polypropylene, and the like. The foam layer may be rigid, semi-rigid or flexible, as desired, to meet specific requirements.

In carrying out the method of this invention, the reactive components necessary to provide an adherent plastic foam between sheets of a base material may be utilized as premixed blends which are separately applied to the material. Thus, for example, in the preparation of a laminate structure having a urethane foam layer, a portion of the polyester or polyether, or mixture thereof, can be prereacted with a suitable isocyanate to form a liquid prepolymer having a viscosity such that it can be pumped or metered. The pre-polymer can be applied to one surface of a sheet of a base material, while a second premixed blend comprising additional polyester or polyether, or mixture thereof, a catalyst and a blowing agent, together with any other ingredients necessary to provide a foam of desired properties, can be applied to the surface of another sheet of the base material. The thusly coated surfaces can then be brought into opposed relation to one another whereby intermixing of the premixed blends will occur, resulting in the formation of an adherent urethane foam layer between the sheets of base material. Similarly, if it is desired to provide an adherent epoxy foam layer, for instance, between two sheets of a base material, a premixed blend which includes an epoxy resin, a blowing agent, wetting agent and solvent can be applied to a surface of one of the sheets, while a curing agent such as diethylene triamine can be applied to a surface of the other sheet. The coated surfaces as before are then placed in opposed relation to one another whereby the epoxy resin blend and the curing agent are intermixed. From this it can be seen that laminate structures having substantially any type of plastic foam layer can be prepared by the practice of the present invention, the only requirement being that the premixed resin blend and the premixed blend of the catalyst, initiator, activator, promoter, or the like, be separately applied to the sheets of base material. The reactive components may, if necessary, be preheated prior to their application on the base material, or after application thereto, to initiate, promote or accelerate the reaction between the intermixed components.

As stated hereinabove, the sheets of the base material, after the reactive component moieties have been applied thereto and after the reactive component carrying surfaces thereof have been brought into opposed relation with respect to one another, advantageously are vibrated, or otherwise agitated, to accelerate intermixing of the reactive components. Following intermixing, the sheeting then can be confined in an area whereby the thickness and the density of the foam, as it forms, can be selectively controlled to provide a laminated structure, of desired thickness.

In FIG. 1 of the accompanying drawing, there is illustrated, somewhat schematically, an embodiment of apparatus for carrying out the method of the present invention. The apparatus shown employs the kiss-roll technique of applying the reactive component moieties to sheets of a material, and is especially suitable for preparing laminated structures such as panelling in a continuous operation. The apparatus comprises two reactive-component, constant-level supply containers or tanks 10 and 12 for holding premixed blends 14 and 16 of the separate components necessary, when intermixed, to produce a plastic foam. Associated with the containers or tanks 10 and 12 are lower, pickup rolls 18 and 20 and upper, casting or transfer rolls 22 and 24, respectively. The rolls 18 and 22, and 20 and 24, rotate in opposite directions with relation to one another, and each cooperating pair of rolls rotates in a direction opposite to that of its counterpart in the separate containers or tanks 10 and 12. The paired rolls 18 and 22, and 20 and 24, act to transfer the blends 14 and 16 in their associated containers or tanks 10 and 12 to one surface of respective sheet materials 26 and 26' unrolled from separate supply rolls 28 and 30. As illustrated, the undersurfaces of the sheet materials 26 and 26' fed from the rolls 28 and 30, are contacted with the upper rolls 22 and 24, respectively, whereby a metered amount of the blends 14 and 16 is coated thereon. While the direction of travel of the sheet material 26 from the roll 28 is unchanged after coating, that of the sheet material 26', from the roll 30, is reversed by means of a roll 32 thereby to bring the coated surfaces of the sheet material into opposed relation to one another.

The two opposed layers of the sheet material can then be vibrated in any manner known in the art. In the arrangement illustrated, this is achieved by passing the sheet material 26 and 26' between a pair of vibrating, oppositely rotating rolls 34—34 where the coatings on the opposed surfaces of the sheet material are intermixed. The sheet material advantageously is then passed between a pair of spaced, opposed, selectively adjustable, rigid plate members 36—36 of sufficient length to enable the foaming reaction between the blends 14 and 16 to be substantially completed. By selective adjustment of the spacing between the plate members 36—36, the thickness of the foam layer formed by the blends 14 and 16, and, correspondingly, the thickness of the resulting panelling can be controlled as desired.

In FIG. 2 of the drawing, there is shown an enlarged vertical sectional view of a laminated structure prepared by the method of the present invention. The structure, as illustrated, comprises opposed, parallely positioned sheets or panels 38—38 having a plastic foam layer 40 adhered to the inner surfaces thereof. The thickness and density of the foam layer 40 can, as indicated hereinabove, be selectively controlled.

Generally speaking, the surfaces of sheet material to be coated by the moieties of the reactive components do not require pretreatment to enable them to form a good adhesive bond with the foam. However, in those instances where the nature of the sheet material or the foam, or both, are not conducive to the formation of a suitable bond, the surfaces between which the foaming reaction is to take place may be subjected to mechanical or chemical treatment, or adhesives may be employed, to enable such a bond to be obtained.

The following examples are illustrative of laminated structures prepared in accordance with the method of the present invention. It should be understood that numerous other sheet materials and plastic foam-forming agents can be utilized in carrying out the method all of which are within the scope of the guiding principles and teachings disclosed herein.

EXAMPLE 1

Utilizing apparatus similar to that illustrated in FIG. 1 of the accompanying drawing, a premixed blend, for use in forming a flexible urethane foam, comprising, by volume, 100 parts of a polyester composition containing 16 moles of adipic acid, 16 moles of diethylene glycol and 1 mole of trimethyol propane, and 47 parts of tolylene diisocyanate, are placed in a container or tank of a kiss-roll arrangement. To another container or tank of a kiss-roll arrangement is added an activator composition made up, by volume, of 3 parts of an adipic acid ester of N-diethyl aminoethanol, 1 part of ammonium oleate, 1.5 parts of sulphonated castor oil, 1 part of water, and 0.5 part of paraffin oil.

A thin coating of the polyester-isocyanate blend is applied at one kiss-roll station to the undersurface of aluminum sheeting fed from a roll. A thin coating of the activator composition is applied at the other kiss-roll station to the undersurface of aluminum sheeting fed from a second roll. The coated surfaces of the aluminum sheeting are then brought into opposed relation to one another at which time the polyester-isocyanate blend and the activator composition are intermixed by vibrating the sheeting. Immediately thereafter the sheeting is moved between flat, metallic plate members spaced approximately ½ inch apart. The foaming reaction is substantially completed in approximately 2 minutes. A section is taken through the resulting flexible laminate. The urethane foam layer measures ⅜ inch and has a density of 2.8 lbs. per square foot.

EXAMPLE 2

A premixed blend, for preparing an epoxy foam, comprising, by weight, 100 parts of an epoxy resin having a molecular weight of 450, 2 parts of a blowing agent (Celogen), 5 parts toluene and a 0.1 part Tween 20, is prepared by heating the epoxy resin to 110° C. and adding it to a mixture of the toluene solvent, the wetting agent and the blowing agent. After thorough mixing the resulting mixture is coated, by spraying, onto one surface of a sheet of fiberglass approximately ⅛ inch in thickness. A coating of diethylene triamine is then applied, by spraying, to one surface of another sheet of fiberglass of corresponding thickness, and the two sprayed surfaces are placed in opposed relation to one another whereby the reactive components thereon are intermixed. The sheets are then quickly placed between two metallic plate members spaced approximately ½ inch apart. Foaming between the sheets occurs in about 30 seconds. A section is taken through the resulting laminate. The epoxy foam layer measures about ¼ inch and has a density of about 7.5 lbs. per square foot.

What is claimed is:

1. A method of preparing foam plastic laminated structures comprising the steps of applying a coating, which incorporates one component at least of the reactive components necessary to form a plastic foam, onto a surface of one sheet of a base material, applying a coating, which incorporates another component of the reactive components necessary to form, with said first mentioned component, a plastic foam, onto a surface of a second sheet of a base material, placing the thusly coated surfaces of the sheets into opposed relation with respect to one another and moving at least one of the sheets in a manner to cause the reactive components contained in the coatings to be intimately intermixed, and allowing the thusly intermixed reactive components to react to form an adherent plastic foam layer between said sheets.

2. A method in accordance with claim 1 wherein both of the sheets of base material are vibrated after the coated surfaces thereof are placed into opposed relation thereby to expedite and promote intimate intermixture of the reactive component moieties.

3. A method in accordance with claim 1 wherein the sheets of base material are placed in a confined area during development of the plastic foam layer therebetween whereby the thickness of the resulting laminate is controlled.

4. A method in accordance with claim 1 wherein the sheets of base material are continuously fed from separate rolls thereof to separate coating stations where one surface of each of the moving sheets is coated, each with a different component of the reactive components necessary to produce a plastic foam, and the coated surfaces of the moving sheets are brought into opposed relation and vibrated to bring about intermixing of the said different reactive components thereon to initiate formation of a plastic foam.

5. A method in accordance with claim 1 wherein said one component comprises a premixed blend containing as its essential active ingredient a mixture of a diisocyanate and a member of the group consisting of polyesters, polyethers, and mixtures thereof, necessary for producing a urethane foam, and said other component comprises an activator composition containing as its essential active ingredient a member of the group consisting of polyesters, polyethers, and mixtures thereof, necessary for producing with said mixture a urethane foam.

6. A method in accordance with claim 1 wherein said one component comprises a premixed blend of an epoxy resin and a blowing agent, and said other component comprises a curing agent which when mixed with said one component will initiate formation of an epoxy foam.

References Cited
UNITED STATES PATENTS

| | | | |
|---|---|---|---|
| 2,651,589 | 9/1953 | Shokal et al. | 156—310 |
| 2,753,276 | 7/1956 | Brochhagen et al. | 156—310 |
| 2,993,871 | 7/1961 | Shannon et al. | 156—79 |
| 3,256,131 | 6/1966 | Koch et al. | 156—79 |
| 3,444,036 | 5/1969 | Russell et al. | 156—79 |
| 3,443,277 | 5/1969 | Frielingsdorf | 156—73 |

REUBEN EPSTEIN, Primary Examiner

U.S. Cl. X.R.

156—79, 310